Patented Aug. 14, 1951

2,564,505

UNITED STATES PATENT OFFICE 2,564,505

BORON DERIVATIVES OF PENICILLIN

Simon L. Ruskin, New York, N. Y.

No Drawing. Application March 12, 1945,
Serial No. 582,418

4 Claims. (Cl. 260—239.1)

The present invention relates to the manufacture of improved therapeutic preparations, and more particularly to boron or boron acid derivatives of penicillin and its salts.

It is the general object of the invention to produce boron or boron acid derivatives of therapeutic substances which derivatives possess one or more important advantages over the original substances from the standpoint of therapeutic activity, stability, increased solubility, reduced hygroscopicity, etc. Other objects and advantages of the invention will become apparent from the following detailed description thereof.

I have found that in general the boron derivatives of penicillin possess a remarkably increased therapeutic activity or efficiency over the original material.

I have found further that boron stabilizes penicillin and the salts of penicillin and acts to delay the excretion of the drug so that the frequency of injection is greatly diminished. It is known that the rate of excretion of penicillin is about 50% in the first half hour after injection and that it is practically completely eliminated in about four hours. Tests made with similar dosages of calcium bor penicillin, prepared in accordance with this invention, have, on the other hand, shown that only about 10% of the penicillin is excreted in the first hour, and that the presence of the drug in the blood is demonstrable after eight hours. This permits the administration of penicillin with good therapeutic effect only three times a day as compared with the six times daily as at present. The use of the bor derivative also represents a great economy in material because of the longer lasting effect.

In the preparation of the penicillin compounds I prefer to add controlled amounts of boric acid and sodium borate to, for example, a solution of sodium penicillin, until the solution is more or less neutral. In this way I obtain a buffered solution having a pH value of 7.1, by the addition of 1.24% of boric acid and 0.13% of sodium borate, by increasing the boric acid and diminishing the sodium borate addition I obtain a solution having a pH value of 6.8 at which the pencillin preparation is most stable. In similar fashion the bor derivatives of calcium, barium, strontium, bismuth, antimony, mercury and other metal penicillin compounds can be prepared.

More specific directions for the preparation of representative compounds of the present invention are set forth in the following example which is presented for purpose of illustration only and not as indicating the limits of the invention.

EXAMPLE

*Calcium bor penicillin*

2.5 g. of calcium penicillin are suspended in 5 cc. of water. To this paste is now added .35 g. of boric acid. The mixture is briskly stirred and heated for five minutes to 50° C. The solution is now frozen and evaporated in vacuo. The potency is equivalent to 500 Oxford units per mg. The product is less soluble in water than calcium penicillin or sodium penicillin, but more soluble than barium penicillium.

The temperature of reaction in the above example may be as high as 80° C. whereby the solubility is increased and the reaction speeded up.

The nature of the reaction produced by the treatment with the boric acid, with or without added alkali metal borate, is not entirely clear. Because of the double valence of boron (3 and 5) and also because in certain instances it exhibits a valence of 4, a number of reactions usually take place. When sodium penicillin is reacted with boric acid, there are obtained bor penicillin, and sodium bor penicillin. In this reaction it is desirable to add enough boric acid to overcome the alkalinity of the formed sodium borate and produce a buffered solution having a pH value of about 6.8. When calcium penicillin is treated with boric acid, a higher proportion of calcium bor penicillin is obtained than is the case with sodium bor penicillin prepared under similar conditions.

If the desired boric acid may be added in such a manner and in such amount that the pH value of the final solution of the therapeutic agent is controlled. Thus the boric acid may be added to a solution of sodium penicillin until the pH value is between 6.5 and 7.3, preferably around 7.0. The solution can then be lyophilized. The dry solid material can be subsequently dissolved in water, or it may be dissolved in glycerine or combined with lanolin or cold cream and lanolin or other fatty vehicles to form a medicated ointment. The concentration of the sodium bor penicillin may correspond to 500 units of penicillin per gram of solution or ointment. The glycerine solution may be used for painting on the wound such as ulcerated tissues in the mouth. Both the water-soluble and likewise the water-insoluble metal bor penicillin compounds may be suspended in sesame, cotton seed or other vegetable oil for intranasal instillation or for intramuscular injection. The concentration in the oil may amount to 5000 units of penicillin per cc. of oil where two or three cc. are to be injected.

I claim:

1. Process for the manufacture of improved therapeutic preparations which comprises treating a solution of a metal salt of penicillin having a pH value of about 8 or more, with a sufficient quantity of boric acid to reduce the pH value to the range 6.5 to 7.3.

2. A boron penicillin compound which is the reaction product of boric acid with a member of the group consisting of penicillin and its metal salts, the reactants being so proportioned as to produce a product having a pH value in the range of 6.5 to 7.3.

3. A boron penicillin compound as defined in claim 2 which is the reaction product of boric acid and sodium penicillin.

4. A boron penicillin compound as defined in claim 2 which is the reaction product of boric acid and calcium penicillin.

SIMON L. RUSKIN.

REFERENCES CITED

The following references are of record in the file of this patent:

UNITED STATES PATENTS

| Number | Name | Date |
| --- | --- | --- |
| 2,261,188 | Scudi | Nov. 4, 1941 |
| 2,332,548 | Auerbach | Oct. 26, 1943 |
| 2,385,262 | Curtis | Sept. 18, 1945 |

OTHER REFERENCES

Coblentz, The New Remedies, 3rd edition, 1899, page 32.